(12) United States Patent
Geist et al.

(10) Patent No.: US 9,864,882 B1
(45) Date of Patent: Jan. 9, 2018

(54) ENERGY HARVESTING FOR BATTERY-LESS RFID TAG DEVICES WITH INTERNAL TRANSMITTERS

(71) Applicant: GEOTOLL INC., Plantation, FL (US)

(72) Inventors: Wyatt D. Geist, Davie, FL (US); Jaime A. Borras, Miramar, FL (US)

(73) Assignee: GeoToll, Inc., Plantation, FL (US)

( * ) Notice: Subject to any disclaimer, the term of this patent is extended or adjusted under 35 U.S.C. 154(b) by 0 days.

(21) Appl. No.: 14/713,204

(22) Filed: May 15, 2015

Related U.S. Application Data

(63) Continuation-in-part of application No. 13/945,990, filed on Jul. 19, 2013.

(60) Provisional application No. 61/993,359, filed on May 15, 2014.

(51) Int. Cl.
*G06K 7/10* (2006.01)
(52) U.S. Cl.
CPC ................. *G06K 7/10158* (2013.01)
(58) Field of Classification Search
CPC ........ G07B 15/00; G07B 15/02; G07B 15/06; G07B 15/063; G06K 19/0723; G06K 19/0707; G06K 19/0705; G06K 19/0724; G06K 19/07767; G06K 7/0008; G06Q 20/32; G06Q 20/3278
USPC ........................................................ 705/13
See application file for complete search history.

(56) References Cited

U.S. PATENT DOCUMENTS

| | | | |
|---|---|---|---|
| 2006/0152369 A1* | 7/2006 | Reunamaki .......... | G06K 7/0008 340/572.1 |
| 2008/0084312 A1* | 4/2008 | Daily .......................... | 340/572.8 |
| 2009/0117872 A1* | 5/2009 | Jorgenson et al. ........... | 455/334 |
| 2011/0260839 A1* | 10/2011 | Cook et al. .................. | 340/10.4 |
| 2012/0242294 A1* | 9/2012 | Muth ............................ | 320/137 |
| 2013/0265140 A1* | 10/2013 | Gudan et al. ................ | 340/10.3 |
| 2013/0293190 A1* | 11/2013 | Pijnenburg .............. | H02J 7/022 320/108 |
| 2014/0025444 A1* | 1/2014 | Willis ............................. | 705/13 |
| 2014/0340267 A1* | 11/2014 | Kim .............................. | 343/713 |
| 2014/0364772 A1* | 12/2014 | Howard et al. ............... | 600/595 |
| 2015/0119728 A1* | 4/2015 | Blackadar et al. ........... | 600/484 |
| 2015/0154490 A1* | 6/2015 | Deavours et al. ............ | 235/492 |

\* cited by examiner

*Primary Examiner* — Laura Nguyen
(74) *Attorney, Agent, or Firm* — The Concept Law Group, P.A.; Scott M. Garrett

(57) ABSTRACT

A battery-less RFID tag device with an RFID antenna assembly and RFID transmitter, which harvests power from an RF source is disclosed. The RF source can be a mobile phone, and embedded system, and the like. The RFID device can include an energy harvesting component, an energy conversion component, an energy storing component, a non-transitory memory, a controller, and an RFID transmitting component. The energy harvesting component can inductively harvest energy from RF transmissions, which charges a capacitor to power other RFID device components, including the RFID transmitter. In one embodiment, the battery-less RFID tag device can be utilized in conjunction with a mobile phone for vehicle toll payments, which are RFID based.

20 Claims, 12 Drawing Sheets

Algorithm

RFID Antenna

RED = Hot radiation to be kept away from shielding plates or metal

*(NOTE: Heat Map colors not possible on line drawings required by USPTO. File wrapper includes colored heat map – see provisional filing.)*

ENERGY HARVESTING FOR BATTERY-LESS RFID TAG DEVICES WITH INTERNAL TRANSMITTERS

CROSS-REFERENCE TO RELATED APPLICATIONS

This utility application converts and claims the benefit of U.S. Provisional 61/993,359 titled "Antenna Coupling to Mobile Device" filed 15 May 2014. This utility application also claims the benefit of application Ser. No. 13/945,990 titled "METHOD AND APPARATUS FOR FACILITATING A WIRELESS TRANSACTION EVENT VIA A RFID TAG DEVICE WITH A MOBILE DEVICE" filed 19 Jul. 2013. The entire contents of U.S. Provisional 61/993,359 and U.S. application Ser. No. 13/945,990 are incorporated by reference herein.

FIELD OF THE DISCLOSURE

The present disclosure relates generally to data tag devices and more particularly to radio frequency data tag devices used to conduct transactions.

BACKGROUND

Radio frequency identification (RFID) tag devices utilize electromagnetic fields to convey data between the RFID tag devices and an RFID reader. The conveyance of data can be bidirectional and can be wirelessly conveyed across typical distances of one to a hundred feet depending on component arrangements of the RFID tag devices. RFID tag devices can be passive, semi-active, or active, referring to how the RFID tag device is powered. A passive RFID tag device is powered by the reader signal. The passive RFID tag device collects energy from the reader signal and uses the collected energy to power the circuitry and transmit data to the reader. Conventional passive RFID tag devices rely of backscattering to transmit data to a reader. Backscattering refers to a reflection of a signal back in the direction from which the signal originated, specifically reflecting RFID reader transmissions back to the RFID reader that emitted these transmissions. A conventional semi-passive RFID tag device includes its own power source, lacks a transmitter, and uses backscattering to transmit data to a reader. An active RFID tag device contains a battery and an on-tag transmitter and does not need to collect energy from the reader nor does it rely on backscattering for data transmissions.

One field where RFID technology is presently used is for transactions. An RFID tag device identifier can be associated with an account, and money transferred from the account to an authorized recipient upon reading information from the RFID tag device in an authorized manner. One popular use of RFID technology for transactions is in vehicular tolls. A vehicle operator purchases a toll tag that includes an RFID tag device, having an identifier in the RFID tag device. The identifier is associated with a toll account for a toll authority. The vehicle operator places the toll tag in a vehicle and upon passing through a toll gateway where the RFID tag device information is read, a toll fee is debited from the account associated with the toll tag.

Large-scale use of RFID tag devices have favored RFID tag devices that are not reliant on batteries as a power source, as exclusion of a battery greatly increases a life span of the devices, reduces production cost significantly, and significantly shrinks a physical footprint of the RFID tag devices. Reliance on backscattering technologies alone, however, significantly limits the range and utility of RFID tag devices.

What is needed is a battery-less RFID tag device that is less reliant on backscattering technologies to transmit data to a remote reader. Ideally, a battery-less RFID tag device would possess advantages of active RFID tags, such as an ability to initiate a communication with a remote reader as opposed to being dependent upon reactive communications only. Ideally, a battery-less RFID tag, would have a sufficient range to replace active RFID tags in usage situations like vehicular toll payment scenarios requiring an RFID transmission range of twenty feet or more, not typically possible or feasible when conventional passive and semi-passive tags are held against a ground plane. Although the above needs have been recognized in the art, no evident solutions exist, which is a deficiency addressed herein by this disclosure.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
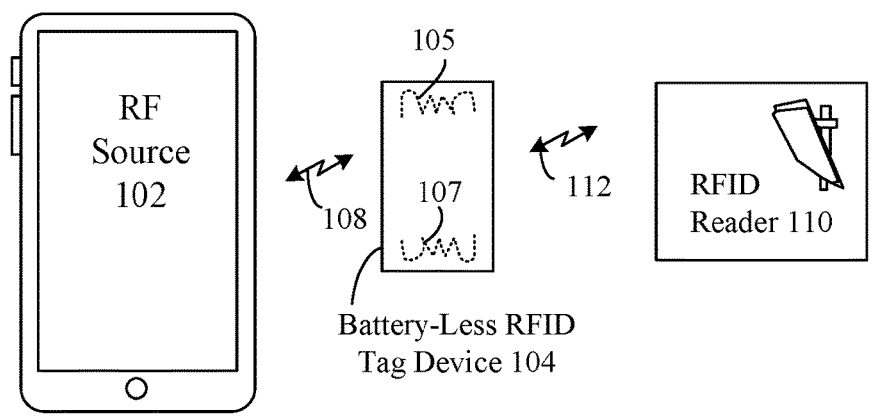
FIG. 1A shows a system of a radio frequency (RF) source, a battery-less RFID tag device, and an RFID reader in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the disclosure provide a battery-less RFID tag device with an internal RFID transceiver powered by harvesting energy from external sources. The harvested energy can be obtained from an RF source, such as through BLUETOOTH transmissions, WIFI transmissions, LTE transmissions, CDMA transmissions, NFC transmissions, and the like. The transmissions can be from a mobile device, a vehicle subsystem, or other external source distinct from and independent of the RFID reader to which RFID transmissions are communicated. A separate antenna and subsystem within the RFID tag device for harvesting energy from an RF source are integrated within the RFID tag device in embodiments. In other embodiments, a direct power source, such as a vehicle battery can be alternatively and/or conjunctively utilized to power the RFID tag device. In one embodiment, an external source that functions as an RF source for powering the RFID tag device can be equipped with geo-positioning components, such as a GPS, which can detect a proximity to both a paired RFID tag device and an RFID reader. Executing software/firmware of this external source can selectively emit RF signals to charge the battery-less RFID tag device when transmissions from the RFID tag device to the RFID reader are merited based on position of the external source. The external source can be an embedded system as well as a mobile device, such as a mobile phone, tablet, or wearable computing device contemplated embodiments.

FIG. 1A shows a system of a radio frequency (RF) source 102, a battery-less RFID tag device 104, and an RFID reader 110 in accordance with some embodiments. The RF source 102 is any device able to emit RFID transmissions, which RFID tag device 104 harvests to generate its power. The RF source can be a mobile device that includes one or more radio transceivers. The RF source 102 can also be an embedded system (such as a vehicle subsystem), a consumer electronic device (such as a WI-FI router), and other RF emitting devices. Examples of mobile devices functioning as RF source 102 include, for example, cellular or "smart" phones, tablet computing devices, personal digital assistants, and so on. The battery-less RFID tag device 104 is an electronic device that utilizes electromagnetic fields to transfer data. One, non-limiting, use case for the RFID tag device 104 is for vehicular tolls, but other applications are contemplated. In embodiments, the RFID tag device 104 can include a first RF interface 107 to harvest power from (and to communicate with in embodiments) the RF source 102 via a radio link 108 and a second RF interface 105 to communicate with RFID reader 110 via radio link 112. The RFID tag device 104 can operate at UHF (915 MHz, for example) and higher frequencies in embodiments. In other embodiments, the RFID tag device 104 can operate at LF and HF bands. Operating frequencies of the RFID tag device 104 are selected at a time of manufacture to enable communications with corresponding RF bands of RFID reader(s) 110 for which the tag device 104 is compatible.

Figure 1B:
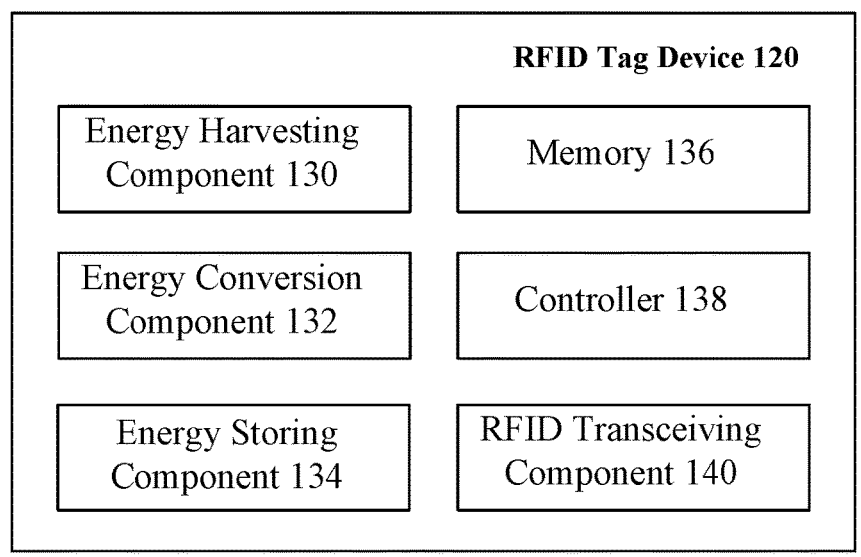
FIG. 1B shows an RFID tag device in accordance with some embodiments.

RFID tag device 120 in FIG. 1B represents an embodiment of battery-less RFID tag device 104, where the first RF interface 107 is part of energy harvesting component 130 and where the second RF interface 105 is part of the RFID transceiving component 140. Device 120 is shown as including a memory 136, a controller 138, and an RFID transceiving component 140, which together perform functions of the RFID tag device 120. Components 130, 132, and/or 134 of device 120 can replace and/or supplement a battery typically utilized by an RFID tag device with an internal RFID transmitter (part of RFID transceiving component 140). It is known in the art that an RFID antenna (part of the RFID transceiving component 140) backscatters transmitter energy of an RFID reader as a form of transmission of data from the RFID tag device. This backscatter effect can be utilized conjunctively with the harvested energy from the RF source to minimize power expenditures of the RFID tag device 120.

The energy harvesting component 130 utilizes an antenna assembly compatible with the RF wavelength(s) of radio link 107. In embodiments, the energy harvesting component 130 can provide power commiserate with the average power that an RFID reader normally provides, which is in the order of +23 dBm or ~200 mW, in some embodiments Designing the RFID tag 120 to utilize conventional quantities of power can minimize manufacturing costs as many off-the-shelf components can be utilized. The energy harvesting component 130 is limited to providing power only in accordance with the amount of power able to be harvested from an RF source 102. Embodiments are contemplated where multiple RF sources 102 can be utilized to increase an amount of power obtained by harvesting component 130.

Energy conversion component 132 can rectify the inductive voltage received from an RF antenna assembly. Component 132 can include DC conversion circuitry to adjust the obtained power to levels used by the RFID tag device 120. Energy storing component 134 represents one or more capacitors that store power obtained from harvesting component 130. Although the RFID tag device 104, 120 is referred to as being a battery-less device, embodiments are contemplated where a backup battery (which functions in addition to RF source 102 obtained power) is contemplated. Further, use of an energy harvesting component 130 is contemplated in devices (such as wearable computing devices like watches) that primarily function off battery power. Receipt and use of power from an energy harvesting component 130 can provide additional power to a device (120), which extends a per-charge operation cycle, which can be highly beneficial in embodiments.

RFID tag device 104, 120 can be adapted to utilize a variety of different emissions as a power source. In one embodiment, the harvesting component 130 can utilize a BLUETOOTH (including a BLUETOOTH LOW VOLTAGE). In such an embodiment, BLUETOOTH conforming transmissions between the RF source 102 and device 104, 120 are able to be utilized to convey information between devices in addition to being used to power components of the battery-less RFID tag device 104. In another embodiment, an effective distance between the RFID tag device and the RF source 102 can be minimal, permitting NFC emissions (from the RF source 102) to power the RFID tag device 104. In other embodiments, radio link 108 and energy harvesting component 130 can operate at cellular frequencies or WI-FI frequencies. Further, the energy harvesting component 130 and conversion component 132 can be designed to operate across a variety of frequency ranges, which would expand a range of commonly utilized RF transmissions able to be harvested, thereby expanding the range of devices able to function as RF source 102. For example, energy harvesting component 130 in one embodiment can operate by capturing energy from BLUETOOTH and Cellular transmissions or from NFC transmissions. BLUETOOTH would expand the effective operating distance over a reliance on NFC ones, and would greatly expand a range of compatible devices. Most smartphones, for example, are equipped with a BLUETOOTH transceiver, while smartphones equipped with a NFC transmitter are more limited. Cellular transmissions provide higher transmission power levels hence more energy in a shorter amount of time.

Regardless of the specifics of the energy providing components used, the RFID tag device 104, 120 can conserve power expenditures by only being powered on when geographically near an RFID reader. For example, in a vehicle toll scenario, the RFID tag device 104, 120 will only need to be active or powered when the RFID tag device 104, 120 is within a relatively short range of an RFID toll reader, which are present at fixed points along a highway system. As many RFID sources 102 (like smartphones and in-vehicle navigation systems) are equipped with geo-positioning components (e.g., GPS), these RF sources can be programmed to selectively emit RFID radio link 108 transmissions when in the relatively short range needed for tag-to-reader communications. In embodiments, energy derived from BLUETOOTH signals may not be sufficiently energized to power the RFID tag device (given a time BLUETOOTH signals are enabled and given power needs of the RFID tag device). For this reason, embodiments are contemplated where one communication channel (using low power BLUETOOTH) is utilized as a data channel for radio link 108 and another different channel (an energy providing channel of radio link 108) is used for a cellular RF signal that powers the energy harvesting components of the RFID tag device 104, 120.

Figure 2:
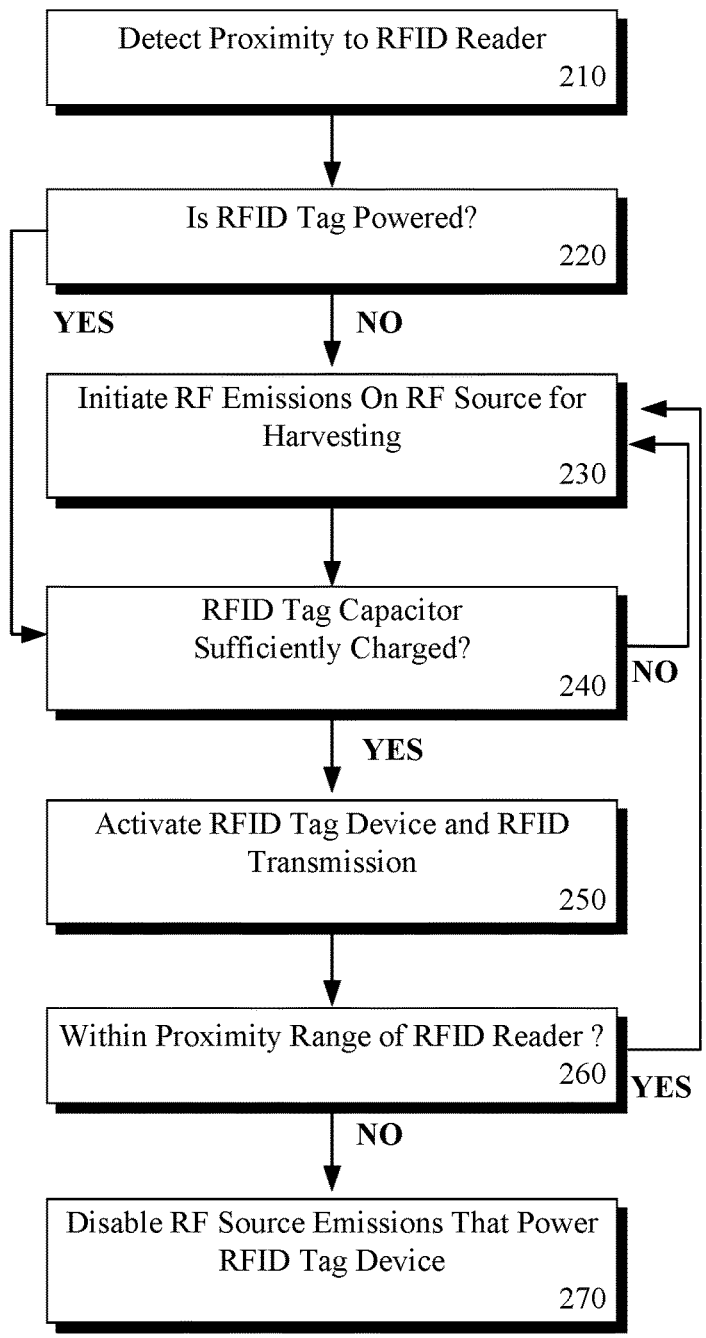
FIG. 2 shows a flow chart for activating the battery-less RFID tag in accordance with embodiment of the disclosure.

FIG. 2 represents a process through which the RFID tag device is selectively powered based on geo-position. Control for the transmission of the RF energy based on a position can be handled by the RF source 102 (e.g., mobile phone, vehicle sub-system, etc.) in one embodiment. In another embodiment, a companion device in communication with the RF source 102 can detect a location of the RFID reader and control emissions used to power the RIM tag device 104.

FIG. 2 shows a flow chart for activating the battery-less RFID tag 104 in accordance with embodiment of the disclosure. In step 210, proximity to the RFID reader can be detected. In one embodiment, application/firmware of a mobile device functioning as an RF source 102 can detect being within a geo-region (utilizing geo-fencing based on a GPS determined position) can be detected. A communication signal (e.g., 108) can be conveyed from this external device to the RFID tag to determine if the RFID tag is powered, as shown by step 220. If the RFID tag is already powered, the process can skip to step 250. Otherwise, the process can proceed to step 230, where the RF source 102 can transmit a signal, whose energy is able to be harvested by the harvesting component 130. This transmission can be a cellular transmission, a WI-FI transmission, a BLUETOOTH transmission, and/or other transmission for which a harvesting antenna of the RFID tag is configured to accept. The RFID tag device can receive and process this signal (using components 132 and 134 for example) to charge a RFID tag device internal power source. In step 240, the RFID tag device can determine if the power source (such as a capacitor) is sufficiently charged. If so, the method can progress to step 250, otherwise the process can loop to step 230 until a sufficient charge for operation is reached. Optionally, a signal can be conveyed from the RFID tag device to the RF source at this point, to halt emissions from the RF source. In some embodiments, the RFID tag device will require continuous charging during operation, so no signal to halt the charging will be conveyed. In other embodiments, a continuous communication (back-and-forth) can exist between the RF source and the RFID tag device to ensure sufficient charge for operation is maintained, which may not require continuous emissions. Emissions can be tailored to maximize power harvesting in one embodiment. In step 250, the now powered RFID tag device can perform internally processes to access data of its memory and to create an RFID transmission, which is transmitted from the RFID device to be read by the RFID reader. The RFID reader can convey acceptance of the transmissions to the RFID tag device and/or the RF source, which can trigger the RF source and/or RFID tag device to halt power-providing emissions. In step 260, the RFID tag device and/or the RF source can detect that the respective device(s) have been moved beyond a proximity range of the RFID reader. If so, step 270 can execute, where the RF source emissions and/or the RFID tag device can be returned to a non-emitting/power-off state. Transmission acknowledgements and exchanges can be conducted at this time (until power of the RFID tag device is no longer powered suitably. When still within range, the process can repeat, as shown by looping from step 260 to step 230.

Figure 3:
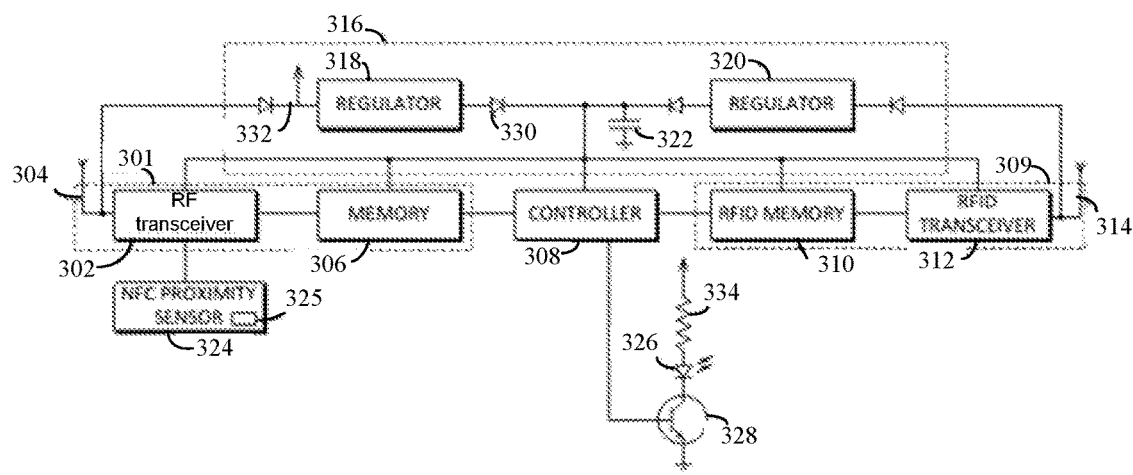
FIG. 3 is a schematic diagram of a battery-less RFID tag device in accordance with some embodiments.

FIG. 3 is a schematic diagram of a battery-less RFID tag device 300 in accordance with some embodiments. The RFID tag device 300 can be substantially similar to the RFID tag device 104 shown in FIG. 1. Generally, the RFID tag device 300 includes circuitry to realize two different RF interfaces, and can include a memory associated with each interface, a controller for operating the RFID tag device, and an energy collection circuit to collect energy from the RF interfaces (RF source) to power the RFID tag device. Accordingly, the RFID tag device 300 includes a first RF interface 301 that can be, for example, a BLUETOOTH, NFC, WI-FI, and/or cellular RF interface. The first interface 301 includes an antenna 304 and a first transceiver 302 that communicates according to a first RF protocol, such as a BLUETOOTH, NFC, WIFI, or cellular protocol. The first RF interface 301 can further include a first memory 306 coupled to the first transceiver 302, and can be used to store data received over the first RF interface 301, or data that is to be transmitted over the first RF interface 301, or both.

The RFID tag device 300 further includes a second RF interface 309, such as a RFID interface, that includes antenna 314 and a second transceiver 312 to communicate according to a second RF protocol, such as, for example, an RFID communication protocol. The second RF interface 309 operates independently of the first RF interface 301 in embodiments. In other embodiments (not shown), a multi-band antenna can be utilized to receive data and to harvest energy from an RF source as well as to conduct RFID transmissions. The second RF interface 309 can further include a second memory 310, such as an RFID memory, that can be coupled to the second transceiver 312 and can contain, for example, one or more substantially unique identifiers that can be used to identify the RFID tag device 300, and which can be associated with a user or a user account in remotely located computing equipment (e.g. account servers).

In some embodiments it is contemplated that there is only one memory shared by each of the RF interfaces 301, 309. In some embodiments, the controller 308 can be provided with registers, cache, or other memory, that can operate as the first and second memories 306, 310. Furthermore, the first memory 306, when implemented as a separate memory, can be a dual interface memory that can be accessed by the first transceiver 302 and the controller 308 by separate, independent memory interfaces. The controller 308 can move data between the memories 306, 310, as well as perform other operations such as formatting data when moving data between memories 306, 310. In some embodiments memory 310 is a ROM, and data received via first RF interface 309 is routed directly to the controller 308. In some embodiments memory 306 is a dual interface memory that is writable, and non-volatile.

The RFID tag device 300 further includes an energy collection circuit 316 that is used to collect energy received from remote transmitters at antennas 304, 314. A first regulator 318 can be used to collect energy at the first RF interface antenna 304, and a second regulator 320 can be used to collect energy at the second RF interface antenna 314. Simple rectifiers (diodes) between antennas 304, 314 and regulators 318, 320 can be used to rectify alternating current (AC) signals to store charge in, for example, a capacitor 322, through blocking diodes 330. The capacitor 322 can be electrically coupled to the interfaces 301, 309, alternatively or at the same time, and the controller 308, to provide power to those components as necessary.

The RFID tag device 300 can further contain circuitry to facilitate optimum location of the RFID tag device 300 on a mobile device (e.g., RF source). For example, a light emitting diode 326 can be controlled by a switch transistor 328 that is operated by the controller 308. Upon power-up or receiving an appropriate command via first RF interface 301 from the mobile device (e.g., RF source), the controller can switch on transistor 328, allowing current to flow through LED 326 from node 332, as limited by resistor 334. During this operation the mobile device (e.g., RF source) continuously transmits over the RF interface so that capacitor 322 is continuously receiving electrical energy via regulator 318. The resulting voltage evident across node 332 is dependent on the efficiency of the coupling between the transmitter of the mobile device and the first RF interface 301. As the RFID tag device is moved relative to the mobile device, the intensity of light emitted from the LED varies in correspondence with the efficiency of the energy providing RF link, allowing the user to optimally locate the RFID tag device 300 on the mobile device (RF source). In other words, the LED 326 can provide visual assurance that the RFID device is receiving sufficient power from the RF source so that corrective actions (such as activating an RF source that is not properly broadcasting or moving the RF source/RFID tag device to ensure that transmissions are not being shielded/blocked, which could impede the energy harvesting. For instance, cellular transmissions used to power the RFID device could be blocked if the cellular device (RF source) were placed in a glove-box or vehicle console that shields the transmissions or lowers their intensity below a desired threshold. Further, some mobile devices have power saving modes that turn off transmissions when the mobile device is below a designated threshold, which may have to be adjusted via user interface adjustment and/or software running on the mobile device.

Figure 4A:
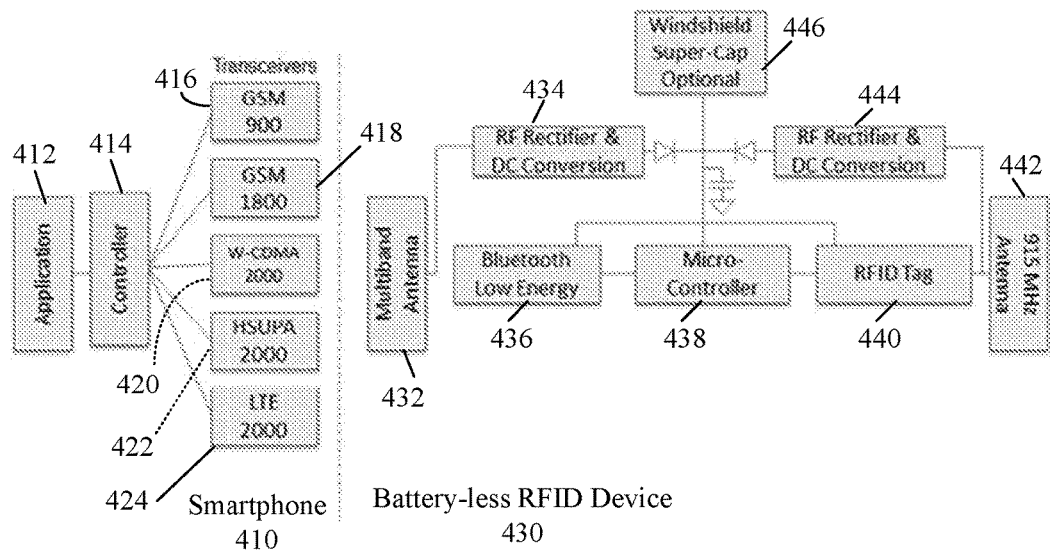
FIG. 4A shows a system of a smartphone RF source interacting with a batteryless RFID device in accordance with some embodiments.
Figure 4B:
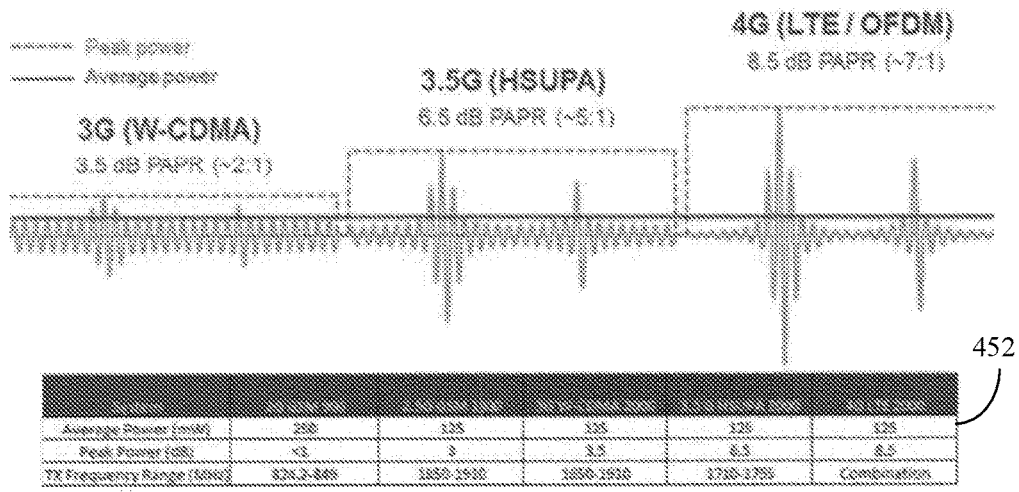
FIG. 4B shows RF signals for power harvesting in accordance with some embodiments.
Figure 4C:
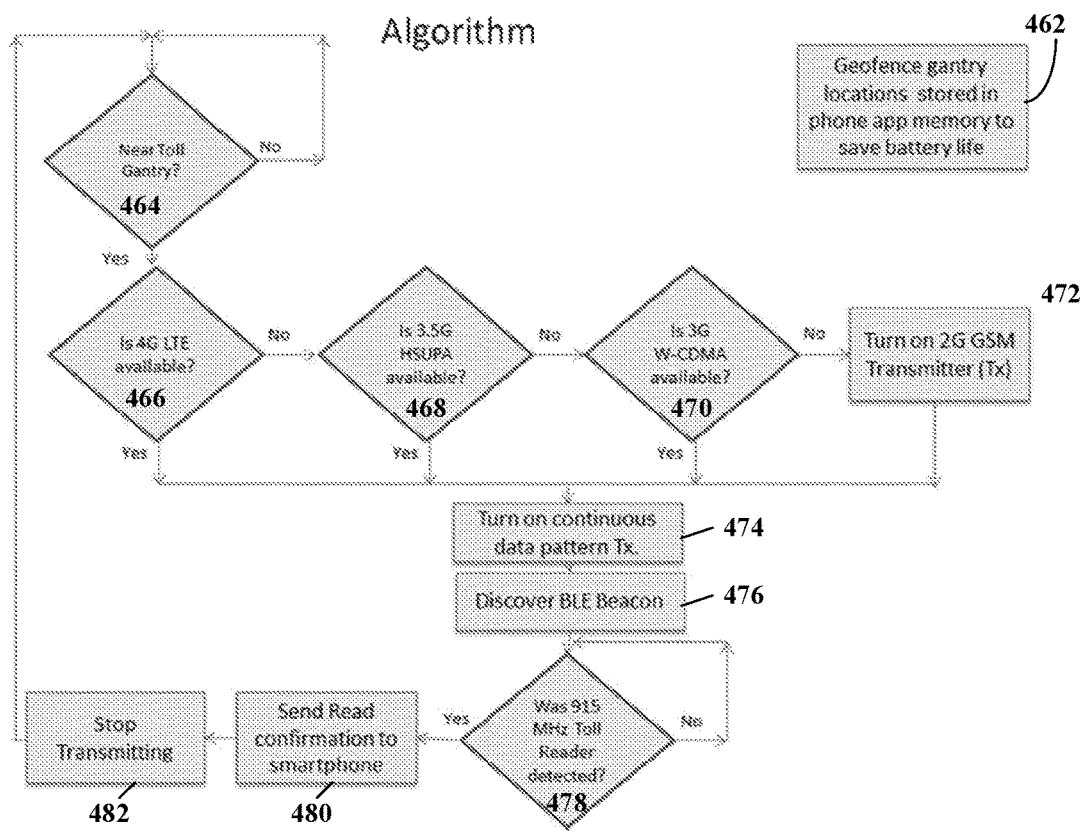
FIG. 4C shows a process of an RF source interacting with a batteryless RFID device in accordance with some embodiments.

FIGS. 4A, 4B, and 4C are directed towards an embodiment of the disclosure for utilizing a battery-less RFID tag device (104) in conjunction with a smartphone (an RF source 102) for an RFID vehicle toll (RFID reader 110). The RFID tag device 104 can be configured as a windshield sticker, which is easy for RFID vehicle toll readers to access. This embodiment assumes that a user's smartphone works in conjunction with the windshield sticker, which allows for existing RFID tolling operations using a battery-less RFID tag. Other embodiments can embed the RFID tag on a rear of a smartphone or in another location (such as on an exterior of a vehicle or can embed the RFID tag device within a vehicle antenna. This use case demonstrates the versatility of the battery-less RFID tag to transmit at a relatively long distance. Those of skill in the art can recognize other use cases within scope of the disclosure not explicitly detailed herein. The smartphone in the embodiment can provide power to the RFID tag device through a cellular transmission while utilizing BLE transmissions for communications between the smartphone and the RFID tag device.

As shown in FIG. 4A, a smartphone can be equipped with multiple transceivers, such as a GMS 900 MHz transceiver 416, a GSM 1800 MHz transceiver 418, a W-CDMA 2000 MHz transceiver 420, a HSUPA 2000 MHz transceiver 422, and an LTE 2000 MHz transceiver 424. Different transceivers are contemplated depending on the smartphone (or other mobile device) that functions as the RF source herein. Some smartphones 410 can be equipped with a NFC transmitter, which can be utilized to power the RFID device 430 as well, especially in embodiments where the RFID tag device is positioned on or in close proximity to the smartphone 410. Use of a window sticker as an RFID tag device 430 will typically exceed the effective transmission range of an NFC transmitter, which many smartphones lack, so utilization of other bands and protocols (such as BLUETOOTH) are especially beneficial when a window sticker is utilized. Application 412 running on the smartphone can detect proximity to a vehicle toll reader, can communicate with the RFID device 430, can transmit within the RF spectrum to power the RFID device 430, and can provide other functions, such as those indicated by FIG. 4C. Application 412 working with controller 414 (which activates/deactivates the transceivers 416-424) can intentionally communicate a data pattern to maximize the power level provided by the transceiver 416-424 for harvesting by the RFID device 430.

As shown in FIG. 4A, the RFID device can include a multiband antenna 432, which captures different transmissions of a set of the transceivers 416-424. The multiband antenna can be connected to an RF rectifier and DC conversion circuit 434 to power the RFID tag 440, the microcontroller 438, and the BLUETOOTH low energy (BLE) 436 circuits. In one option, a super capacitor 446 can be connected to a vehicle windshield and to the circuit allowing a second RF rectifier and DC conversion circuit 444 to harvest burst energy from the 915 MHz toll gantry reader (via 915 MHz antenna 442) to provide additional harvested energy.

The principle energy harvesting source of system 400 is through the smartphone 410, which is controlled by the application 412 that selectively tunes one or more of its transmitters (416-424). FIG. 4B illustrates 450 RF signal peak-to-average power ratios or different communication systems in the smartphone 410. Summary table 452 summarizes average power in mW, peak power in dBs, and transmit frequency range(s) of various ones of the transceivers 416-424. Per table 452 and illustration 450, higher data throughput systems (like 4G LTE) have corresponding higher peak power while keeping the average power at the same 125 mW. The smartphone 410, per system 400, also controls transmit power according to network coverage, so to generate maximum power for harvesting by device 430 a continuous data pattern can be sent. Sending such a pattern can provide a harvesting energy increase of two to three orders of magnitude (2.66 times based on 8.5 dB PARP) over voice communication power levels.

FIG. 4C shows a process, able to be implemented as a machine algorithm in embodiments. The algorithm activates transmissions on the highest power possible for a given smartphone 410 and utilizes geofencing for toll gantry locations. These locations can be stored in a memory (462) accessible by the smartphone application (412). Use of these gantry locations permits operation while avoiding having to keep interrogating a server to obtain geo-coordinates (which is an alternative embodiment), thereby saving battery life of the system 400.

In FIG. 4C, when near a toll gantry (464), one or more suitable radios can be activated if not. Checks are shown for a 4G LTE radio (466), a 3.5G HSUP radio (468), a 3G W-CDMA radio (470), and a 2G GSM radio (472). These checks can be performed in an order (as shown) to maximize power output available for harvesting (as illustrated in FIG. 4B) in one contemplated embodiment. In step 474, a continuous data pattern for transmission can be enabled, which maximizes harvestable energy. In step 476, a BLE beacon can be discovered (now that some level of power is available to the battery-less RFID tag device). If a toll gantry (a 915 MHz toll reader) is detected, a read confirmation can be sent (480) to the smartphone and transmissions are stopped (482). Although communications are shown as being conducted through BLE, in an alternative embodiment communications between the RFID tag device and a smartphone can occur through other communication channels. BLE is included due to its range and power conservation features, which is beneficial in embodiments. Other embodiments (such as when an RFID tag device is a sticker placed on a back of a smartphone 410) can efficiently utilize NFC for data transmissions (and power harvesting), for example. In such an embodiment, innovations detailed in U.S. provisional 61/993,359 to which priority is claimed (specifically referencing the section labeled "Antenna Coupling to Mobile Devices" elaborates on a construction of a RFID antenna that minimizes attenuation resulting from a proximate smartphone activating as a ground plane can be utilized.

Contemplated embodiments of the disclosure utilize additional power sources to power the battery-less RFID device. FIGS. 5A, 5B, 5C, 5D, and 5E are directed towards a variant of the previous smartphone 410/sticker 430 configuration that emphasizes usage of additional power source(s) and component arrangements. Use of a vehicular toll example is one contemplated species of the genus described herein (battery-less RFID device that harvests power), which serves as a non-limiting example of use of additional power sources.

Figure 5A:
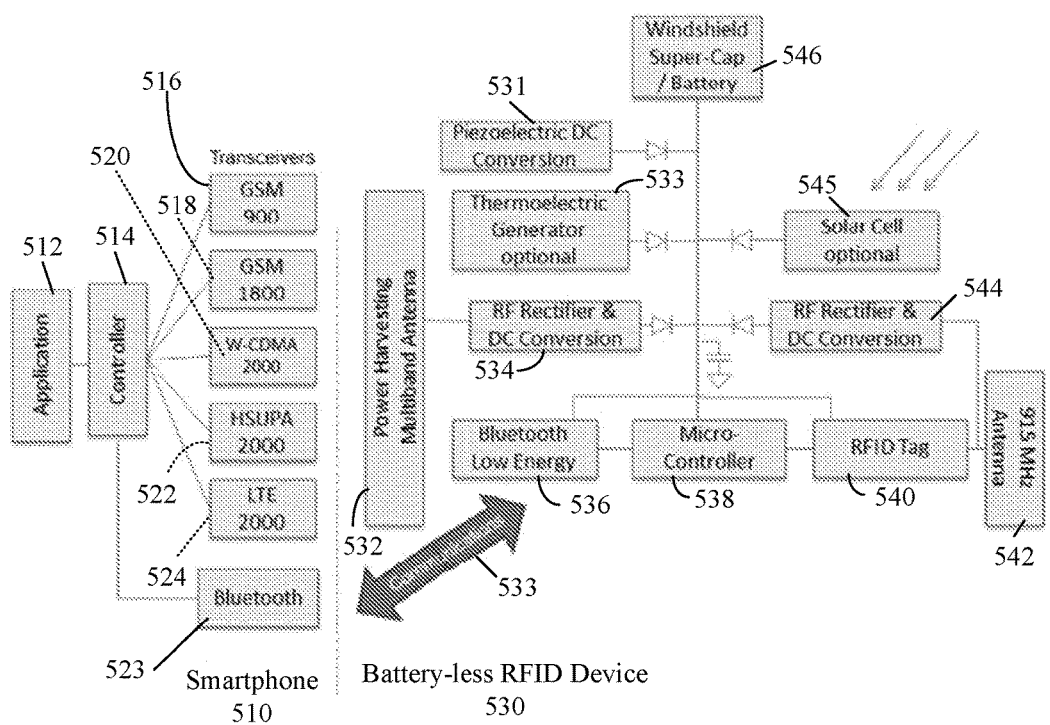
FIG. 5A shows a system of a smartphone RF source interacting with an RFID device in accordance with some embodiments.

FIG. 5A shows a system 500 including a smartphone 510 interacting with a sticker tag 530. This sticker tag 530 can be placed inside a shark fin antenna structure (item 570 of FIG. 5C) instead of upon a windshield in one configuration. In such an embodiment, a dipole radiating structure (of an RFID antenna assembly) can be located on the inside top of the shark fin cover for best proximity to toll readers. In such a configuration, an RFID antenna hot lead (see FIG. 5D) can be positioned away from metal or shielding plates, which could hamper operation.

Per system 500, the smartphone 510 runs an application 512 linked to a controller 514 of a set of transceivers 516, 518, 520, 522, 523, and 524. A multiband antenna 532 harvests power from these transceives, which is rectified and converted (534) to power RFID tag components including RFID tag 540, microcontroller 538, and BLE circuit 536. A windshield super capacitor 546 and RF rectifier and DC conversion circuitry 544 can also provide power, as previously noted for FIG. 4A. Piezoelectric DC conversion circuit 531, thermoelectric generator 533, and solar cell 545 can power components, such as RFID tag 540, microcontroller 538, and BLE circuit 536 in one embodiment. The piezoelectric DC circuit 531 can convert kinetic energy (of the vehicle) into electricity. The solar cell 545 and thermoelectric generator 533 can utilize energy from the sun and/or temperature differentials to generate electrical energy for device 530. The kinetic (vibration/motion), electromagnet and thermal harvesting energy sources can be continuously functioning to keep a super capacitor fully charged. It is only when the capacitor of device 530 lack sufficient stored energy (and when a vehicle is approaching a toll reader) that smartphone 510 transmissions are triggered (and/or toll reader transmissions are harvested) to ensure that the device 530 is sufficiently powered. Thus, additional energy sources minimize the need to rely on an RF source for powering the battery-less RFID tag device in embodiments of the disclosure.

Figure 5B:
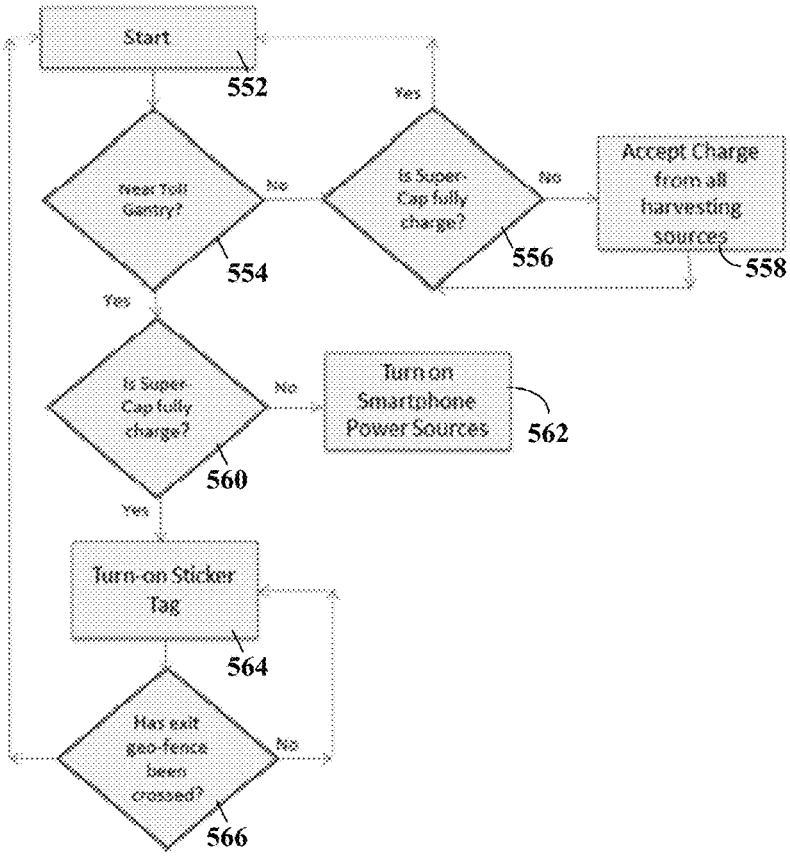
FIG. 5B shows a process of a smartphone RF source interacting with an RFID device in accordance with some embodiments.
Figure 5C:
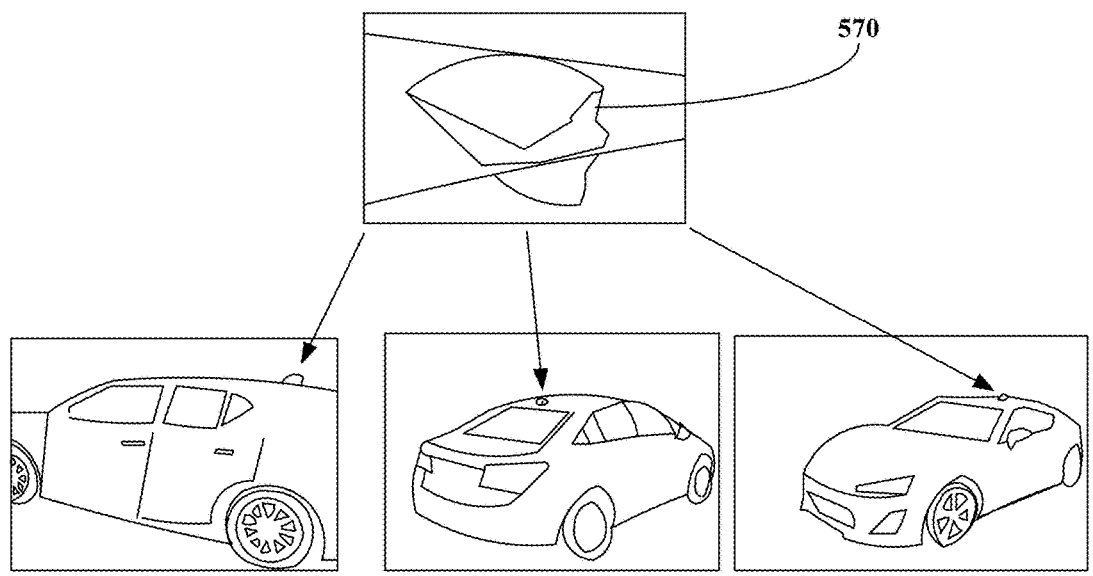
FIG. 5C shows a shark fin vehicle antenna in accordance with some embodiments.

FIG. 5B shows a process 550 for system 500 in accordance with embodiments. The process 550 starts (552) and when not near a toll gantry (554) a check is made to see if the super capacity is fully charged (564). If additional charge is needed, a charge is accepted by all available harvesting sources (558), such as a piezoelectric circuit (531), a solar cell (545), and/or a thermoelectric generator (533). It may or may not be possible to ensure the capacitor of a battery-less RFID device 530 remains fully charged depending on environmental and situational conditions. When near the toll gantry (step 554 processing to step 560), a smartphone power source functioning as an RF source is activated (562) causing it to emit RF energy for harvesting. In step 564, the battery-less RFID device (a sticker based RFID tag in embodiments) is powered onto an active state. Low power states are possible for the RFID tag device to conserve on power expenditures when an active state (full power) is unnecessary. The RFID tag device remains in this active state until it is no longer in proximity to the toll gantry or until a confirmation from the toll gantry of a successful toll function occurrence, as shown by step 566.

Figure 5D:
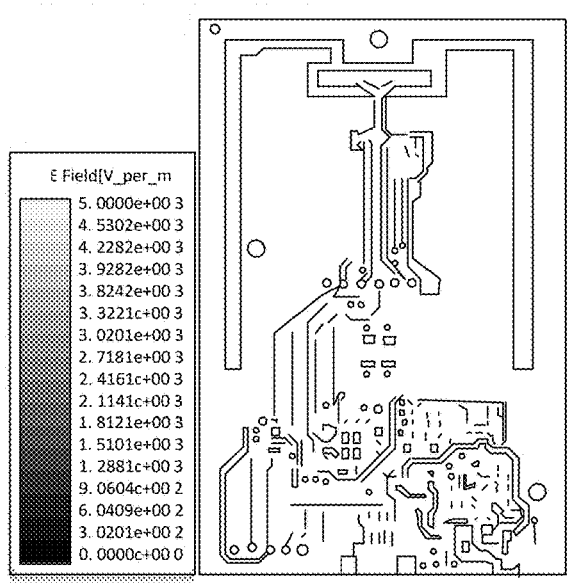
FIG. 5D shows an RFID antenna and its respective E Field values in accordance with some embodiments.

FIG. 5D shows an RFID antenna and its respective E Field values in accordance with some embodiments, specifically it shows E Field values when using an RFID tag device in conjunction with a shark-fin antenna location, assuming that the RFID tag device is positioned to be kept away from shielding plates or metal.

Figure 5E:
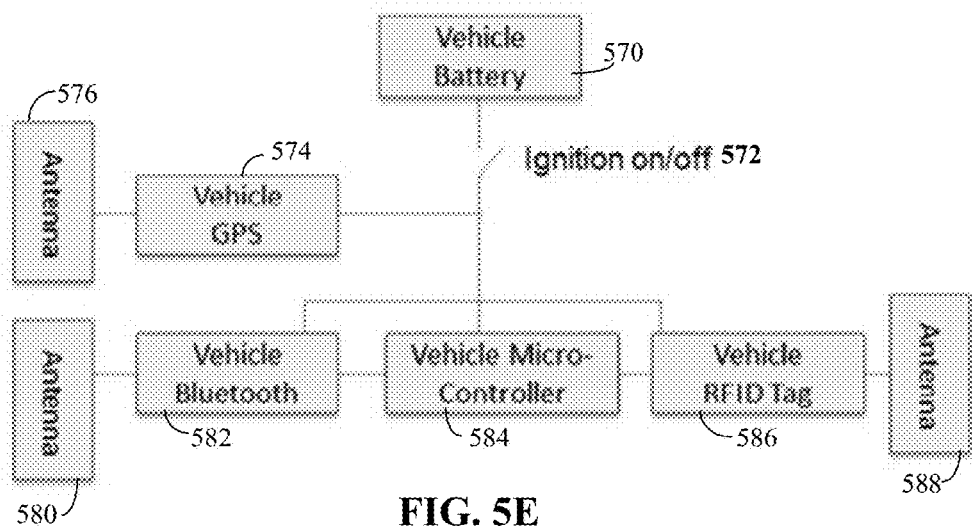
FIG. 5E shows an embedded system block diagram for a vehicle with an integrated vehicle RFID tag in accordance with some embodiments.

Contemplated embodiments of system 500 and process 550 can directly power the RFID tag device using a vehicle battery, as shown by FIG. 5E. Further, the RFID tag device can be an integrated component of a vehicle subsystem. The vehicle subsystem can include a vehicle GPS system 574 and GPS antenna 576. A vehicle microcontroller 584 can be linked to the vehicle RFID tag 586. The vehicle subsystems can permit BLUETOOTH (582) communications through a BLUETOOTH antenna 580. RFID antenna 588 (and/or energy harvesting antennas, such as antenna 532) connects to the vehicle RFID tag circuitry 586. Vehicle subsystem components can be powered (at least in part) from a vehicle battery 570, which may be powered only when the ignition is on (572) in embodiments.

Figure 6A:
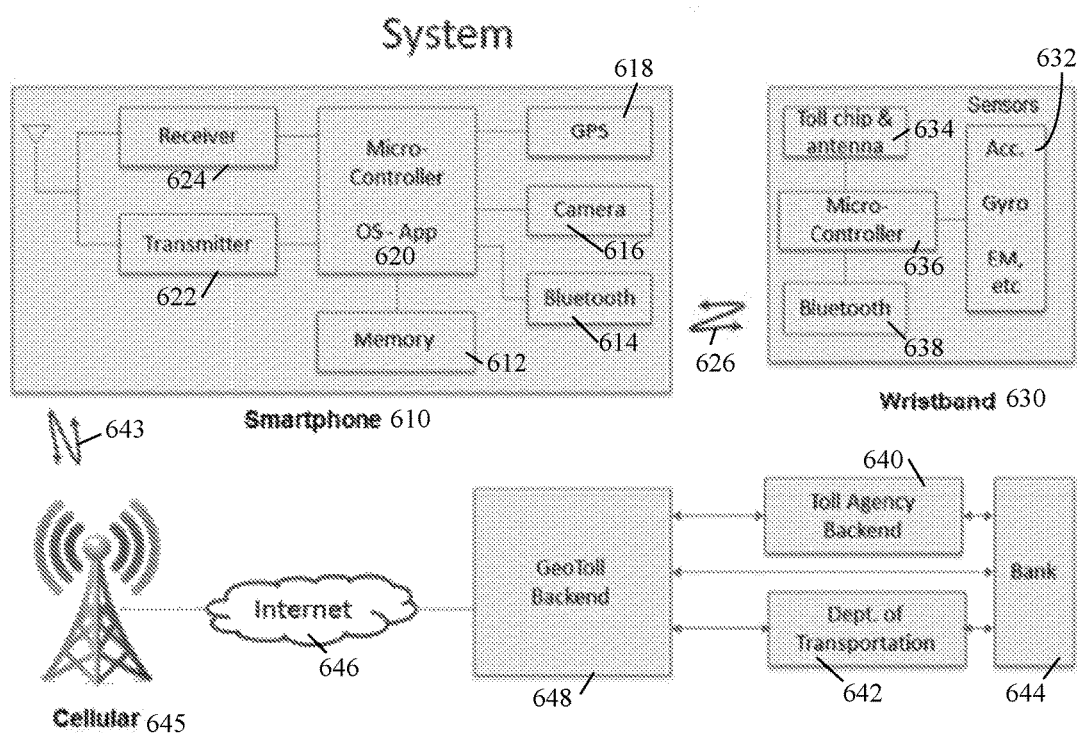
FIG. 6A shows a system of a smartphone RF source interacting with a wristband wearable device in accordance with some embodiments.

Contemplated embodiments of the disclosure can integrate functionality of the RFID tag device into a wearable electronic device, such as a wristband or watch. In such an embodiment, some control (such as that of application 512) may remain in an external device, such as a smart phone 510. This functionality is also contemplated to be placed inside the wearable device itself in embodiments. As functionality of wearables varies greatly depending on specifics, a level of integration, communication, and functional offloading between the wearable and an external device, such as a smartphone 510 can vary per implementation. For purposes of the scenario addressed by FIGS. 6A and 6B, it is assumed that GPS functionality resides in a companion smartphone, as does relied upon memory 612 and processing, while the wearable (wristband 630) includes a set of sensors 632 providing information to the RFID tag device and/or the smartphone 610. In embodiments, the RFID tag device may be implemented as a sticker or distinct component coupled to the wearable. If implemented as a sticker to a wearable, innovations detailed in U.S. provisional 61/993,359 to which priority is claimed (specifically referencing the section labeled "Antenna Coupling to Mobile Devices" elaborates on a construction of a RFID antenna that minimizes attenuation resulting from a proximate smartphone activating as a ground plane can be utilized. Placement of the RFID tag device functionality on a wrist (via a wearable) is a convenient location in many instances, such as for vehicle tolls since placement of the wrist (and by extension the RFID tag device) is in an ideal line-of-sight location for a toll reader.

System 600 shows a smartphone 610 having one or more receivers 624 and transmitters 622 linked to a microcontroller 620. The microcontroller can run a smartphone operating system and set of applications in one embodiment. A memory 612 is linked to the microcontroller 620, as are GPS 618, camera 616, and BLUETOOTH 614 components. Smartphone 610 can communicate 643, 626 with a cellular network 645 and with wristband 630 utilizing one or more internal transmission/receiving components (see transceivers 516-524, for example).

In one embodiment, cellular communications 643 with a cellular network 645 can permit internet 646 communications with a back-end internet-based server 648. This server 648 can integrate with a toll agency server 640, with a bank system 644, and with other backend systems (such as those of the department of transportation 642) for vehicle toll monitoring, payment, and tracking purposes. Use of internet-based communications results in a highly flexible system permitting functionality with conventional RFID based tolls not otherwise possible/practical. For example, a high occupancy vehicle (HOV) functionality can be built into the smartphone 610 application and/or backend server 648. This feature allows a user to input (or in-vehicle systems/monitoring can automatically determine this data) a number of occupants in the vehicle. HOV functionally can result in discounts on toll charges, which are handled (reported and logged), automatically by backend server 648.

In one embodiment, toll sharing is contemplated such that multiple vehicle inhabitants (such as a driver and one or more passengers) have separate vehicle tolling accounts. Charges for travel in such instances can be proportioned between these different accounts in any definable manner defined by the passengers. These complications and features can be handled by backend server 648 without any additional requirements being imposed on independent systems (like those of the toll agency 640 or the department of transportation 642). To avoid multiple charges for a vehicle toll when multiple passengers have toll paying accounts and devices, backend server 648 can enable/disable one or more accounts during a specific trip. In one embodiment, by default a driver's toll account will be utilized and passenger toll account(s)/device(s) disabled. This default behavior can be overridden or changed by user input. Further, the backend server can utilize additional accounts should any prepaid amounts of a primary account (default) be deficient, in which case additional funds necessary can be automatically charged to other available accounts that function as "backup payment" accounts for purposes of a toll-laden trip.

Wristband 630 includes a toll chip and antenna assembly 634, a microcontroller 636, and a BLUETOOTH (or other short range) transceiver 638. A set of sensors 632, such as an accelerometer, a gyroscope, a microphone, a touch-input screen, etc. are present. In embodiments, activation/deactivation of the RFID toll device can occur by performing a characteristic action detected by one of the sensors 632. For example, a driver wearing wristband 630 can perform a hand motion (such as shaking their wrist) to activate the RFID tag device. This activation can include powering the device, which may include transmissions from an RF source (like smartphone 610) in embodiments. Once activated, the RFID tag device can be powered for a period of time (necessary to interact with a vehicle toll reader, for example) after which it is powered off, or placed in a low power mode. As shown, some of the components (e.g., component 634, 636, 638) of the wristband 630 can be ones that are duplicative (due to use of a commercial wristband) with functionally equivalent ones present in the RFID tag device. RFID tag devices can be constructed for specific commercially available wristbands 630 to minimize redundance and to corresponding minimize manufacturing costs. The sensors 632 are optional components not assumed to be present in every wristband 630 with which the RFID tag devices are able to function.

It should be appreciated that some backend functions/services (of backend server 648) can require a pairing between wristband 630 and smartphone 610 as information provided via a smartphone 610 communication channel (643) is necessary as is information (such as GPS 618 data or data from memory 612) provided by the smartphone 610. This information need not be conveyed to backend server 648 as shown, in all embodiments, however. For example, information can be locally conveyed over communication channel 626 from smartphone 610 to the wristband 630 (and from the wristband to the RFID tag device, as necessary) where this information is thereafter transmitted via RFID transmissions to a RFID reader, which conveys the information (via toll agency backend (640)) to backend server 648.

Figure 6B:
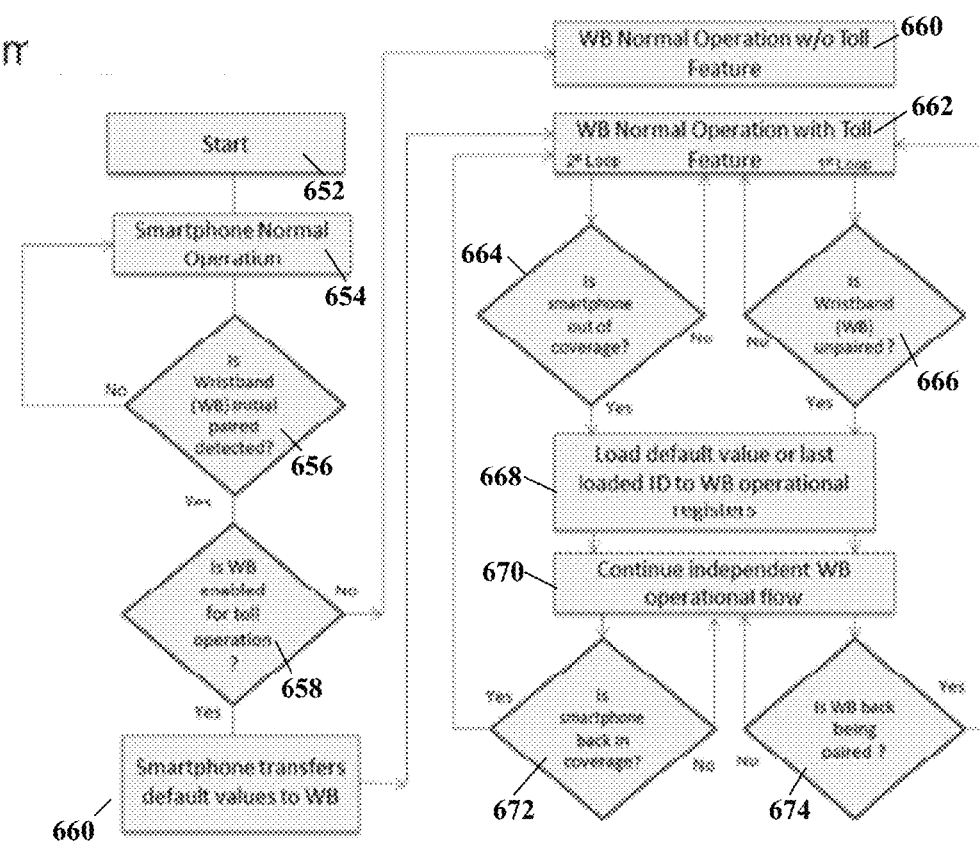
FIG. 6B shows a process of a smartphone RF source interacting with a wristband wearable device in accordance with some embodiments.

FIG. 6B provides a non-limiting process 650 through which components of system 600 function. Process 650 can start (step 652), where a smartphone is in a normal operation state (654). A wristband 630 may be paired (e.g., BLUETOOTH pairing) with the smartphone 610 or not. If so, step 658 can execute where a determination of whether the wristband 630 is enabled for toll operation occurs. If not enabled, the wristband can continue to provide its normal operational features without the toll specific ones being enabled, as shown by step 660. When the toll features are enabled, the process can proceed to step 662. If the wristband 630 is paired (step 666) to the smartphone 610 and if the smartphone is within coverage range (664) then 'normal' communications for toll payment is possible. This normal communication involves communications 626 from wristband to smartphone 610 and smartphone 610 to backend server (via element 643, 645, and 646). If there is a communication issue (either the smartphone is out of range 664 or the wristband is unpaired 666) then wristband 630 toll payment is possible. This process enables an RFID tag device to be read by a proximate RFID reader (toll gantry), which transaction is able to be conveyed back to the backend server 638 when communications are restored. As shown by step 668, default values and identifiers are loaded into wristband operational registers. Independent wristband 630 operation (which can involve wristband RFID tag device interactions, but excludes any additional functionality provided by smartphone 610 being involved in the communications/interactions) proceeds, as shown by step 670. Checks can be made (steps 672, 674) to restore smartphone 610 interactions that can expand functionality of the system 650.

Figure 7:
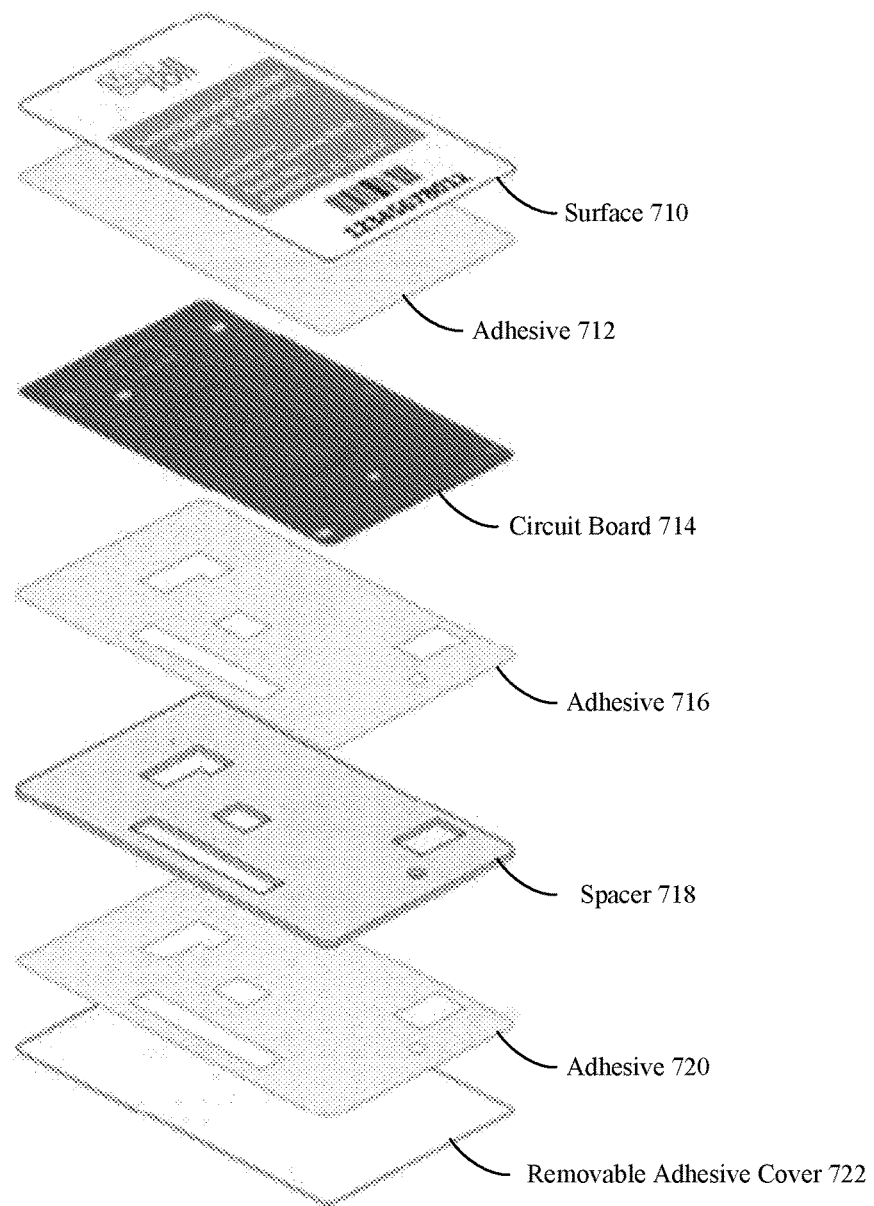
FIG. 7 shows a decomposition of one embodiment of an adhesive coupled RFID device in accordance with some embodiments.

Embodiments of the disclosure permit the RFID tag device 104 to be adhesively coupled to a surface. FIG. 7 shows a decomposition of one embodiment of an adhesive coupled RFID device. The device can include a top printed surface 710, coupled via adhesive 712 to a circuit board 714, coupled with adhesive 716 to a spacer 718, coupled with adhesive 720 to a removable adhesive cover 722, which has a removable adhesive protector.

Surface 710 can provide an identifier for the RFID tag device, which may include a unique key, bar code, or other unique identifier. The circuit board 714 represents a printed circuit board (PCB). The printed circuit board includes the RFID antenna assembly.

Spacer 718 can be formed from a foam material or other insulator. Use of a compressible foam as a spacer can be beneficial in embodiments that rely on double-sided pressure sensitive adhesives to bond between layers and surfaces.

The adhesive layers 712, 716 can be a low surface energy (LSE) adhesive designed to bond to hard to stick to surfaces, such as plastics, polypropylene, polyethylene, polystyrene, thermoplastic polyolefin's, EVA, PTFE, powder coated paints and oily metal surfaces. A pressure sensitive adhesive tape can be used as an adhesive layer 712, 716 in contemplated embodiments. For example, in one embodiment, layers 716 and 720 can utilize a double-sided 300LSE adhesive tape and layer 712 can be a double-sided 467 LSE adhesive tape.

In one arrangement adhesive layer 720 can be an adhesive vynol adhesive that provides for pressure-sensitive adhesive bonds for low and high surface energy materials. Specifically, layer 720 can be designed to form a strong bond with materials of surfaces to which the attachment occurs.

Accordingly, the embodiments provide the benefit of using a battery-less RFID tag device for long-distance RFID transmissions, allow for increased functionality, fewer device failures, and cheaper manufacturing, without loss of user-facing functionality. Further, coupling the RFID tag devices to mobile devices (like smartphones, which are able to function as an RF source) permits a leveraging of functionality of the mobile device for RFID-based purposes, such as vehicle toll payments via RFID.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency identification (RFID) tag device, comprising:
   a first transceiver at a first radio frequency (RF) interface and coupled to an energy harvesting component and including an RF antenna assembly that operates at a first RF frequency and is operable to receive RF energy from an RF source;
   an energy conversion component converting RF energy inductively obtained from the energy harvesting component to DC;
   an energy storing component comprising a capacitor for storing energy output from the energy conversion component;
   a non-transitory memory storing information;
   a controller comprising a processor coupled to the non-transitory memory; and
   a second transceiver at a second RF interface and operable as an RFID transceiver comprising an RFID antenna assembly that operates at a second RF frequency to receive a RFID read signal and transmit the information stored in the non-transitory memory to an RFID reader, wherein the RFID tag device lacks a battery, wherein the capacitor's power provided by the energy harvesting component and the energy conversion component power operation of the controller and the RFID transceiver, and wherein the RFID transceiver utilizes backscattering of the read signal in conjunction with energy harvested by the energy harvesting component to transmit the information in response to the read signal;
   wherein the controller is operable to transmit a halt signal to the RF source via the first transceiver when the capacitor is sufficiently charged to provide energy to operate the second transceiver to transmit the information stored in the non-transitory memory to the RFID reader, and is further operable to, while the RFID transceiver is transmitting the information to the RFID reader, to transmit a signal to the RF source to recommence transmitting to the first RF interface, and wherein the controller is further operable to repeat the halt and recommence transmitting until the second RF interface is finished transmitting to the RFID reader.

2. The RFID tag device of claim 1, wherein the RFID transceiver transmits to the RFID reader at a range of twenty feet or greater.

3. The RFID tag device of claim 1, wherein the RF antenna assembly is a multiband antenna operable to harvest energy from RF transmissions of a plurality of cellular bands.

4. The RFID tag device of claim 1, wherein the RFID antenna assembly comprises an UHF antenna operating at 915 MHz.

5. The RFID tag device of claim 1, further comprising:
   a BLUETOOTH low energy circuitry powered by the energy storing component, wherein the controller communicates with a proximate mobile device using the BLUETOOTH low energy circuitry, wherein the proximate mobile device emits cellular transmissions harvested by the energy harvesting component.

6. The RFID tag device of claim 1, wherein the radio frequency identification tag is a multilayered structure with a circuit board comprising one layer, said circuit board comprising the energy harvesting component, the energy conversion component, the energy storing component, the controller, and the RF transceiver, wherein the circuit board is joined to an upper layer and to a lower layer of the multilayered structure via a low surface energy, press adhesive layer, wherein one of the layers of the multilayered structure is a foam layer, wherein a lower layer of the multilayered structure is an adhesive layer for coupling the radio frequency identification device to an exterior surface.

7. The RFID tag of device of claim 1, wherein the energy conversion component further comprises:
   an RF rectifier and DC conversion component integrated to the RFID antenna assembly for harvesting energy from the RFID reader for storage by the energy storage component.

8. The RFID tag of device 1, wherein the energy harvesting and energy conversion components comprise:
   piezoelectric circuitry for converting kinetic energy into electrical energy for storage by the energy storage component.

9. The RFID tag device of claim 1, wherein the RF source is a mobile phone which detects a proximity to the RFID reader, and wherein the mobile phone is configured to transmit the RF energy that is harvested by the RFID tag device in response to detecting proximity to the RFID reader.

10. A vehicle RFID toll system comprising:
   a battery-less radio frequency identification (RFID) tag device powered at a first RF interface for using a first RF transceiver, by harvesting RF energy at the first RF interface from an RF source to charge an internal capacitor of the RFID tag, which enables an internal RFID transceiver at a second RF interface to transmit information to a remote RFID toll reader in response to a read signal from the RFID toll reader, and wherein the RFID transceiver utilizes backscattering of the read signal in conjunction with energy harvested via the first RF interface to transmit the information in response to the read signal; and
   the RF source wirelessly and communicatively linked to the battery-less RFID tag device at the first RF interface, wherein the RF source detects a proximity to the RFID toll reader and in response to this detection transmits the RF energy that is harvested by the battery-less RFID tag device;
   wherein the battery-less RFID tag device is operable to transmit a halt signal to the RF source via the first RF transceiver when the capacitor is sufficiently charged to provide energy to operate the second RF interface, and is further operable to, while the RFID transceiver is transmitting the information to the RFID reader, to transmit a signal to the RF source to recommence transmitting to the first RF interface, and wherein the controller is further operable to repeat the halt and recommence transmitting until the second RF interface is finished transmitting to the RFID reader.

11. The vehicle RFID toll system of claim 10, wherein the battery-less RFID tag device comprises:
an energy harvesting component coupled to the first RF interface comprising an RF antenna assembly that operates at a first RF frequency, which is a frequency at which RF energy is transmitted by the RF source;
an energy conversion component converting energy inductively obtained from the energy harvesting component;
an energy storing component comprising a capacitor for storing power from the energy conversion component, wherein said energy storing component comprise the internal capacitor;
a non-transitory memory storing information;
a controller comprising a processor; and
an RFID transceiver component coupled to the second RF interface comprising the RFID transceiver, which includes an RFID antenna assembly that operates at a second RF frequency, wherein the RFID transceiver component wirelessly transmits data representing the information stored in the non-transitory memory to the RFID reader, wherein power provided by the energy harvesting component and the energy conversion component power operation of the controller and the RFID transceiver component.

12. The vehicle RFID toll system of claim 10 wherein the RF source is a smartphone.

13. The vehicle RFID toll system of claim 10, wherein the RF energy transmitted from the RF source is a cellular transmission.

14. The vehicle RFID toll system of claim 13, wherein data communications between the RF source and the battery-less RFID tag device are BLUETOOTH low energy communications.

15. The vehicle RFID toll system of claim 10, wherein the RF energy transmitted from the RF source is a WI-FI transmission.

16. The vehicle RFID toll system of claim 10, wherein the RF energy transmitted from the RF source comprises a BLUETOOTH transmission.

17. The vehicle RFID toll system of claim 11, wherein the battery-less RFID tag device is a multilayered structure with a circuit board comprising one layer, said circuit board comprising the energy harvesting component, the energy conversion component, the energy storing component, the controller, and the RF transceiver, wherein the circuit board is joined to an upper layer and to a lower layer of the multilayered structure via a low surface energy, press adhesive layer, wherein one of the layers of the multilayered structure is a foam layer, wherein a lower layer of the multilayered structure is an adhesive layer for coupling the radio frequency identification device to an exterior surface.

18. The vehicle RFID toll system of claim 10, wherein the RFID tag device is integrated in a shark antenna of a vehicle.

19. A radio frequency identification (RFID) tag device comprising:
a first RF interface for a first RF transceiver including a first RF antenna assembly that operates at a first RF frequency which is coupled to an RF energy harvesting component that is configured to inductively capture energy from a transceiver of a mobile phone via the first RF interface;
an RF rectifier and DC conversion circuitry configured to charge a capacitor using the captured energy from the first RF antenna;
the capacitor is further configured to provide power, derived from the charge, to a microcontroller and a RFID tag transceiver; and
a second RF interface, coupled to the RFID transceiver, and including a second RF antenna assembly, the second RF interface including the second RF antenna assembly connected to the RFID transceiver and configured to receive a read signal from a RFID reader and transmit RFID information to the RFID reader in response to the read signal from the RFID reader, and wherein the RFID transceiver utilizes backscattering of the read signal in conjunction with energy harvested by the energy harvesting component to transmit the information in response to the read signal; and
a controller coupled to the first RF transceiver, the RFID transceiver, and the capacitor, and wherein the controller is operable to transmit a halt signal to the mobile phone via the first transceiver when the capacitor is sufficiently charged to provide energy to operate the RFID transceiver to transmit the information stored in a non-transitory memory to the RFID reader, and wherein the controller is further operable, while the RFID transceiver is transmitting to the RFID reader, to transmit a signal to the mobile phone to recommence transmitting to the first RF interface, and wherein the controller is further operable to repeat the halt and recommence transmitting until the second RF interface is finished transmitting to the RFID reader.

20. The RFID tag device of claim 19, further comprising:
BLUETOOTH low energy circuitry powered by the capacitor, said BLUETOOTH low energy circuitry communicating with the mobile phone to change a state of transmissions from the mobile phone used to power the RFID tag device.

* * * * *